US012775140B2

(12) United States Patent
Shikama et al.

(10) Patent No.: US 12,775,140 B2
(45) Date of Patent: Oct. 27, 2026

(54) OPTICAL CONNECTOR CONNECTION STRUCTURE

(71) Applicant: NTT, Inc., Tokyo (JP)

(72) Inventors: Kota Shikama, Tokyo (JP); Yuzo Ishii, Tokyo (JP); Ryo Nagase, Tokyo (JP); Norio Sato, Tokyo (JP)

(73) Assignee: NTT, INC., Tokyo (JP)

( * ) Notice: Subject to any disclaimer, the term of this patent is extended or adjusted under 35 U.S.C. 154(b) by 324 days.

(21) Appl. No.: 18/693,099

(22) PCT Filed: Sep. 28, 2021

(86) PCT No.: PCT/JP2021/035657
§ 371 (c)(1),
(2) Date: Mar. 18, 2024

(87) PCT Pub. No.: WO2023/053211
PCT Pub. Date: Apr. 6, 2023

(65) Prior Publication Data

US 2025/0130376 A1 Apr. 24, 2025

(51) Int. Cl.
*G02B 6/38* (2006.01)

(52) U.S. Cl.
CPC .................................. *G02B 6/3886* (2013.01)

(58) Field of Classification Search
CPC .................................................... G02B 6/3886
See application file for complete search history.

(56) References Cited

U.S. PATENT DOCUMENTS

| | | | | |
|---|---|---|---|---|
| 9,829,655 | B2 * | 11/2017 | Erdman | G02B 6/3886 |
| 10,381,782 | B2 * | 8/2019 | Byrne | H01R 13/6205 |
| 2010/0027941 | A1 * | 2/2010 | Stewart | H01R 13/6315 385/62 |
| 2011/0136350 | A1 | 6/2011 | Palli et al. | |
| 2014/0120746 | A1 * | 5/2014 | Persion | H01R 13/6205 439/39 |
| 2023/0003950 | A1 * | 1/2023 | Shikama | G02B 6/3885 |
| 2023/0113735 | A1 | 4/2023 | Fujiwara et al. | |

FOREIGN PATENT DOCUMENTS

| | | | | |
|---|---|---|---|---|
| WO | 20211117733 | A1 | 6/2021 | |
| WO | WO-2021111773 | A1 * | 6/2021 | G02B 6/3885 |
| WO | 2021172551 | A | 9/2021 | |

OTHER PUBLICATIONS

Shikama et al., “Miniature Optical Connector with Magnetic Physical Contact,” 2020 Optical Fiber Communications Conference and Exhibition (OFC), Mar. 2020 San Diego, CA, USA, 3 Pgs. As discussed in the specification.

* cited by examiner

*Primary Examiner* — Jerry Rahll
(74) *Attorney, Agent, or Firm* — Slater Matsil, LLP

(57) ABSTRACT

A first magnetic structure integrated with a first ferrule is made of a soft magnetic material. A second magnetic structure integrated with a second ferrule is made of a soft magnetic material having a shorter length in a longitudinal direction of optical fibers than that of the first magnetic structure. After connection end faces of the first and second ferrules are connected to each other, third magnetic structures made of a hard magnetic material are attached to an end face side opposite to a connection end face of the second magnetic structure connected to the first magnetic structure.

19 Claims, 32 Drawing Sheets

OPTICAL CONNECTOR CONNECTION STRUCTURE

CROSS-REFERENCE TO RELATED APPLICATIONS

This application is a national phase entry of PCT Application No. PCT/JP2021/035657, filed on Sep. 28, 2021, which application is hereby incorporated herein by reference.

TECHNICAL FIELD

The present invention relates to a technique for connecting optical connectors to each other, and more particularly to an optical connector connection structure which is excellent in attachment and detachment characteristics while using a magnetic force.

BACKGROUND

In accordance with growing needs for optical interconnects in a data center, needs for multicore optical connectors represented by MT connectors and MPO connectors are increasing. In both of the MT connectors and the MPO connectors, connection end faces of opposing ferrules are positioned by fitting pins. Also, when single mode fibers are connected to each other using the MT connectors, a matching material is used between the connection end faces of the ferrules. When single mode fibers are connected to each other using the MPO connectors, a physical contact (PC) connection is performed in which the connection end faces of the ferrules are made to be oblique end faces and the connection end faces are pressed against each other by applying a pressing force of about 10 to 20 N.

In both of the MT connectors and the MPO connectors, a pressing mechanism using a mechanical element such as a spring or a clip is used for pressing the connection end faces of the ferrules and holding the connection state. However, there is a limit to miniaturization of the connectors due to space limitations for holding mechanical elements or attaching and detaching the mechanical elements.

As a means for realizing miniaturization, an optical connector has been proposed in which a mechanical element such as a spring or a clip is eliminated, magnets are attached to peripheries of ferrules, and the ferrules are pressed against each other by a magnetic force generated from the magnets (see NPL 1).

However, in the configuration using magnets, the connection between connection end faces of the ferrules and the connection between the magnets attached to the ferrules occur simultaneously, and thus, there is a problem that attachment and detachment of the optical connector is difficult. That is, in a case in which a magnetic attraction force of, for example, about 10 N is applied between optical connectors, it is necessary to apply a force larger than the magnetic attraction force in a direction opposite to the magnetic attraction force when two connected optical connectors are separated from each other, and the connection is difficult to release. Further, there is a possibility that a guide pin or the like may be deformed when the optical connectors are separated from each other. In addition, even when two optical connectors are connected to each other, a large magnetic attraction force is generated between the optical connectors, and thus there is a possibility that the magnets may collide with each other vigorously, and the magnets may be chipped.

CITATION LIST

Non Patent Literature

NPL 1—Kota Shikama, Norio Sato, Atsushi Aratake, Satoshi Shigematsu, and Takeshi Sakamoto, "Miniature Optical Connector with Magnetic Physical Contact", Proc. Optical fiber communication Conference 2020, W2A.

SUMMARY

Technical Problem

Embodiments of the present invention have been made to solve the above problems, and an object of embodiments of the present invention is to provide an optical connector connection structure in which workability of attachment and detachment of an optical connector can be improved.

Solution to Problem

An optical connector connection structure of embodiments of the present invention includes a first optical connector attached to a tip of a first optical fiber and a second optical connector attached to a tip of a second optical fiber and connectable to the first optical connector, wherein the first optical connector includes a first alignment component configured to fix the first optical fiber and a first magnetic structure integrated with the first alignment component, the second optical connector includes a second alignment component configured to fix the second optical fiber and a second magnetic structure integrated with the second alignment component, the first magnetic structure is made of a soft magnetic material, the second magnetic structure is made of a soft magnetic material having a length shorter in a longitudinal direction of the first optical fiber than that of the first magnetic structure, and a third magnetic structure made of a hard magnetic material is disposed on an end face side opposite to a connection end face of the second magnetic structure with the first magnetic structure.

Also, in one configuration example of the optical connector connection structure of embodiments of the present invention, the third magnetic structure is made of two or more hard magnetic materials, and the third magnetic structure having a cylindrical shape obtained by combining these hard magnetic materials is attached to a periphery of the second alignment component.

Also, in one configuration example of the optical connector connection structure of embodiments of the present invention, the second magnetic structure is made of two or more soft magnetic materials, and the soft magnetic materials are disposed at the periphery of the second alignment component in a form in which they are separated from each other via a gap filled with air or a nonmagnetic material.

Also, one configuration example of the optical connector connection structure of embodiments of the present invention further includes a fourth magnetic structure made of a soft magnetic material disposed on an end face side opposite to a connection end face of the third magnetic structure with the second magnetic structure.

Also, in one configuration example of the optical connector connection structure of embodiments of the present invention, the fourth magnetic structure is made of two or more soft magnetic materials, and the fourth magnetic structure having a cylindrical shape obtained by combining these soft magnetic materials is attached to the periphery of the second alignment component.

Also, in one configuration example of the optical connector connection structure of embodiments of the present invention, the first and second alignment components and the first and second magnetic structures have positioning structures for determining a positional relationship between the first alignment component and the first magnetic structure and a positional relationship between the second alignment component and the second magnetic structure, respectively.

Also, in one configuration example of the optical connector connection structure of embodiments of the present invention, the second magnetic structure is integrally molded with the second alignment component.

Also, an optical connector connection structure of embodiments of the present invention includes a first optical connector attached to a tip of a first optical fiber and a second optical connector attached to a tip of a second optical fiber and connectable to the first optical connector, wherein the first optical connector includes a first alignment component configured to fix the first optical fiber and a first magnetic structure integrated with the first alignment component, the second optical connector includes a second alignment component configured to fix the second optical fiber and a second magnetic structure integrated with the second alignment component, the first and second magnetic structures are made of a soft magnetic material, connection end faces of the first and second alignment components, which are opposed to each other, protrude with respect to connection end faces of the first and second magnetic structures, which are opposed to each other, a third magnetic structure made of a hard magnetic material is disposed such that the first magnetic structure and the second magnetic structure are connected to each other when the first optical connector is connected to the second optical connector, the third magnetic structure is made of two or more hard magnetic materials, and the third magnetic structure having a cylindrical shape obtained by combining these hard magnetic materials is attached to peripheries of the connection end faces of the first and the second alignment components.

Also, an optical connector connection structure of embodiments of the present invention includes a first optical connector attached to a tip of a first optical fiber and a second optical connector attached to a tip of a second optical fiber and connectable to the first optical connector, wherein the first optical connector includes a first alignment component configured to fix the first optical fiber and a first magnetic structure integrated with the first alignment component, the second optical connector includes a second alignment component configured to fix the second optical fiber, the first magnetic structure is made of a soft magnetic material, a second magnetic structure is disposed at a periphery of the second alignment component, the second magnetic structure is made of two or more hard magnetic materials, the second magnetic structure having a cylindrical shape obtained by combining the hard magnetic materials is attached around the second alignment component, and at least one of the second alignment component and the second magnetic structure has a positioning structure for determining a positional relationship between the second alignment component and the second magnetic structure.

Advantageous Effects of Embodiments of the Invention

According to embodiments of the present invention, the first magnetic structure is made of a soft magnetic material, the second magnetic structure is made of a soft magnetic material having a length shorter in the longitudinal direction of the optical fiber than that of the first magnetic structure, and the third magnetic structure made of a hard magnetic material can be mounted on the end face side opposite to the connection end face of the second magnetic structure with the first magnetic structure, whereby the connection between the connection end faces of the first and second alignment components and the attachment of the third magnetic structure can be performed in different processes, and thus workability of the attachment and detachment of the optical connector can be improved.

DETAILED DESCRIPTION OF ILLUSTRATIVE EMBODIMENTS

First Example

Figure 1A:
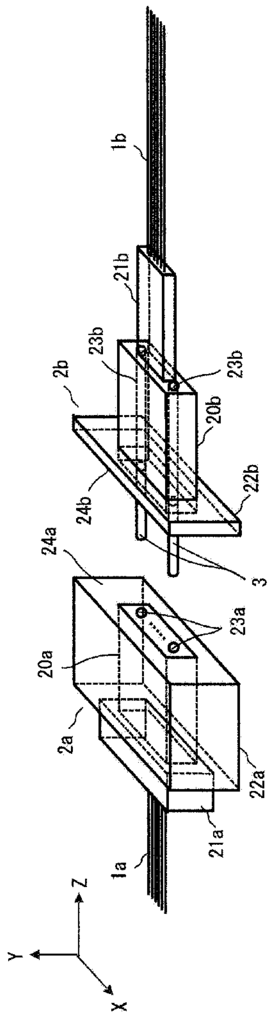
FIG. 1A is a perspective view of a multicore optical connector connection structure according to a first example of embodiments of the present invention before ferrule connection.
Figure 1B:
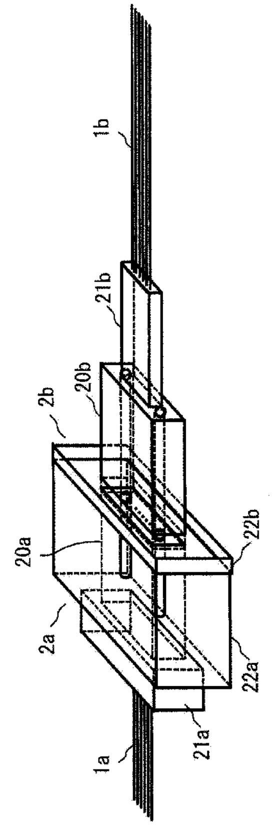
FIG. 1B is a perspective view of the multicore optical connector connection structure according to the first example of embodiments of the present invention after the ferrule connection.
Figure 2:
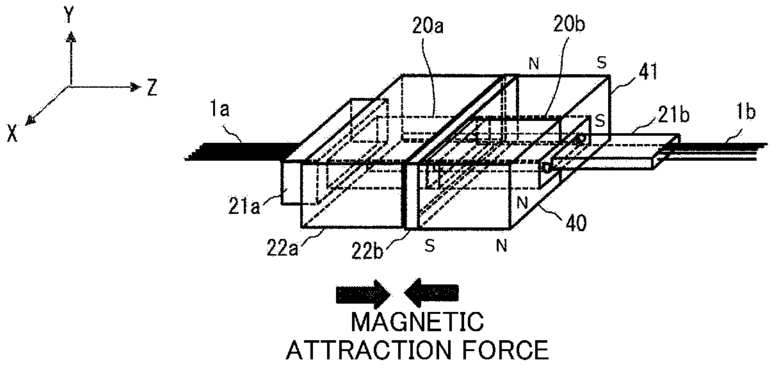
FIG. 2 is a perspective view showing a state in which magnets are attached after the ferrule connection of the multicore optical connector connection structure according to the first example of embodiments of the present invention.
Figure 3A:
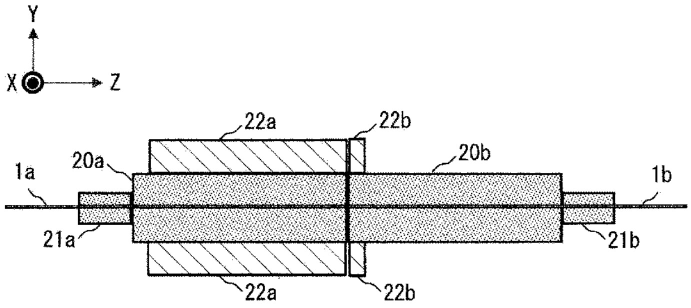
FIG. 3A is a cross-sectional view of the multicore optical connector connection structure according to the first example of embodiments of the present invention after the ferrule connection.
Figure 3B:
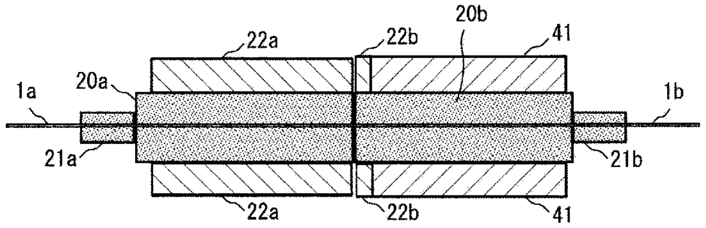
FIG. 3B is a cross-sectional view showing a state in which magnets are attached after the ferrule connection of the multicore optical connector connection structure according to the first example of embodiments of the present invention.

Examples of embodiments of the present invention will be described in detail with reference to the drawings. FIG. 1A is a perspective view of a multicore optical connector connection structure according to a first example of embodiments of the present invention before ferrule connection, and FIG. 1B is a perspective view of the multicore optical connector connection structure after the ferrule connection. FIG. 2 is a perspective view showing a state in which magnets are attached after the ferrule connection of the multicore optical connector connection structure. FIG. 3A is a cross-sectional view of the multicore optical connector connection structure of FIG. 1B taken along a YZ plane, and FIG. 3B is a cross-sectional view of the multicore optical connector connection structure of FIG. 2 taken along the YZ plane.

The multicore optical connector connection structure of the present example includes an optical connector 2*a* attached to tips of a plurality of optical fibers 1*a*, an optical connector 2*b* attached to tips of a plurality of optical fibers 1*b*, and guide pins 3 that connect ferrules of the optical connectors 2*a* and 2*b* to each other.

The optical connector 2*a* includes a ferrule 20*a* (a first alignment component) attached to the tips of the optical fibers 1*a*, a boot 21*a* that bundles the optical fibers 1*a*, and a magnetic structure 22*a* (a first magnetic structure) attached to a periphery of the ferrule 20*a*. Similarly, the optical connector 2*b* includes a ferrule 20*b* (a second alignment component) attached to the tips of the optical fibers 1*b*, a boot 21*b* that bundles the optical fibers 1*b*, and a magnetic structure 22*b* (a second magnetic structure) attached to a periphery of the ferrule 20*b*.

The optical fibers 1*a* and 1*b* are 8-core quartz single mode fibers each having a clad diameter of, for example, 125 μm, a core diameter of about 10 μm and disposed at a pitch of about 250 μm.

The ferrules 20*a* and 20*b* are multicore ferrules having a plurality of micro holes into which the plurality of optical fibers 1*a* and 1*b* are inserted. The ferrules 20*a* and 20*b* are known MT ferrules, and two guide pin holes 23*a* and 23*b* penetrating the ferrules 20*a* and 20*b* are formed in a longitudinal direction (a Z axis direction) of the optical fibers 1*a* and 1*b*.

The optical fibers 1*a* from which coatings are removed are inserted one by one into the plurality of micro holes of the ferrule 20*a*. Similarly, the optical fibers 1*b* from which coatings are removed are inserted one by one into the plurality of micro holes of the ferrule 20*b*. The optical fibers 1*a* and 1*b* and the ferrules 20*a* and 20*b* are fixed by adhesives. Also, in FIGS. 1A, 1B, 2, 3A, and 3B, illustrations of the adhesives and the optical fiber coatings are omitted.

Opposing connection end faces of the ferrules 20*a* and 20*b*, opposing connection end faces of the optical fibers 1*a* and 1*b*, and opposing connection end faces 24*a* and 24*b* of the magnetic structures 22*a* and 22*b* are perpendicular to the Z axis direction.

The optical fibers 1*a* and 1*b* are positioned to slightly protrude from the connection end faces of the ferrules 20*a* and 20*b*, and the connection end faces of the optical fibers 1*a* and 1*b* are polished.

The connection end face 24*a* of the magnetic structure 22*a* and the connection end face of the ferrule 20*a* are positioned to be aligned on the same plane, but the connection end face of the ferrule 20*a* may be positioned to protrude from the connection end face 24*a* of the magnetic structure 22*a*. Similarly, the connection end face 24*b* of the magnetic structure 22*b* and the connection end face of the ferrule 20*b* are positioned to be aligned on the same plane, but the connection end face of the ferrule 20*b* may be positioned to protrude from the connection end face 24*b* of the magnetic structure 22*b*.

A length of the magnetic structure 22*b* in the Z axis direction is set to be shorter than those of the magnetic structure 22*a* and the ferrules 20*a* and 20*b*. The length of the magnetic structure 22*b* in the Z axis direction is, for example, about 1 mm. On the other hand, a length of the magnetic structure 22*a* in the Z axis direction is approximately equal to the lengths of the ferrules 20*a* and 20*b* and is, for example, approximately 6 mm.

In the present example, as shown in FIGS. 1A and 1B, the guide pins 3 are inserted one by one into the two guide pin holes 23*b* of the ferrule 20*b* of the optical connector 2*b*, these guide pins 3 are inserted into the guide pin holes 23*a* of the ferrule 20*a* of the optical connector 2*a*, the connection end faces of the ferrules 20*a* and 20*b* are butted against each other, and the connection end faces of the optical fibers 1*a* and 1*b* are butted against each other, thereby connecting the optical connectors 2*a* and 2*b* to each other. The positioning of the ferrules 20*a* and 20*b*, that is, the positioning of the optical fibers 1*a* and 1*b*, is performed by the guide pins 3.

The magnetic structures 22*a* and 22*b* are both made of a soft magnetic material. As the soft magnetic material, a metal attracted to a magnet is known, for example, iron, nickel, cobalt, permalloy, and the like. In addition, among stainless steel (SUS), which is an iron-based alloy, magnetic stainless steel (for example, SUS430) can also be used.

For a method for joining the ferrules 20*a* and 20*b* and the magnetic structures 22*a* and 22*b*, any joining method such as adhesion, mechanical fitting, or metal joining (solder or the like) may be used.

Also, in the present example, magnetic structures 40 and 41 (a third magnetic structure) are disposed on the end face side opposite to the connection end face 24*b* of the magnetic structure 22*b*. The magnetic structures 40 and 41 are made of a hard magnetic material (a so-called magnet). When the longitudinal direction of the optical fibers 1*a* and 1*b* is defined as the Z axis direction, magnetization directions of N poles and S poles of the magnetic structures 40 and 41 are set in the Z axis direction. For a material of the magnet, any of known magnets may be used depending on a magnetic force to be provided. For a representative magnet, a neodymium magnet can be used. In addition, known magnets such as a ferrite magnet, an alnico magnet, a samarium cobalt magnet, a KS steel, a MK steel, and a neodymium iron boron magnet can be used for the magnetic structures 40 and 41. Also, any of these magnets whose magnetic characteristics are adjusted by slightly changing their composition can be used naturally in the same way.

As shown in FIG. 2, each of the magnetic structures 40 and 41 is made of a hard magnetic material having a half-split structure obtained by dividing a square cylinder into halves. By combining the magnetic structures 40 and 41 to be formed into a square cylinder shape, a part of the ferrule 20*b* can be housed inside the cylinder. As described above, the magnetization directions of the N and S poles of the magnetic structures 40 and 41 are set in the Z axis direction, but the magnetization directions of the N and S poles are set to be opposite to each other so that they are integrated by a magnetic attraction force. For example, in the example shown in FIG. 2, the magnetization direction of the magnetic structure 40 is set so that the S pole and the N pole are arranged in order in the Z axis direction from the magnetic structure 22*b* side, while the magnetization direction of the magnetic structure 41 is set so that the N pole and the S pole are arranged in order in the Z axis direction from the magnetic structure 22*b* side.

It is not always necessary to integrate the magnetic structures 40 and 41 with the ferrules 20*a* and 20*b*. The magnetic structures 40 and 41 are coupled to the magnetic structure 22*b* by a magnetic attraction force, but are not fixed to the ferrule 20*b*, and thus they can be freely attached to and detached from each other.

A method for attaching the magnetic structures 40 and 41 will be described with reference to FIGS. 4A and 4B. The method for butting the ferrules 20*a* and 20*b* with each other is as described above. In this case, since no magnetic attraction force is generated between the magnetic structures 22*a* and 22*b* made of a soft magnetic material, the connection can be easily completed by pressing the ferrules 20*a* and 20*b* with each other by a jig or manual work.

Next, the magnetic structures 40 and 41 are combined to form a square cylinder shape so that the optical fibers 1*a* fit inside the cylinder. The magnetic structures 40 and 41 are integrated by a magnetic attraction force. Then, as shown in FIG. 4B, by bringing the integrated magnetic structures 40 and 41 close to the magnetic structure 22*b*, a magnetic attraction force acts between the magnetic structure 22*b* and the magnetic structures 40 and 41 to connect them. The ferrule 20*b* is housed in the cylindrical magnetic structures 40 and 41.

Figure 4A:
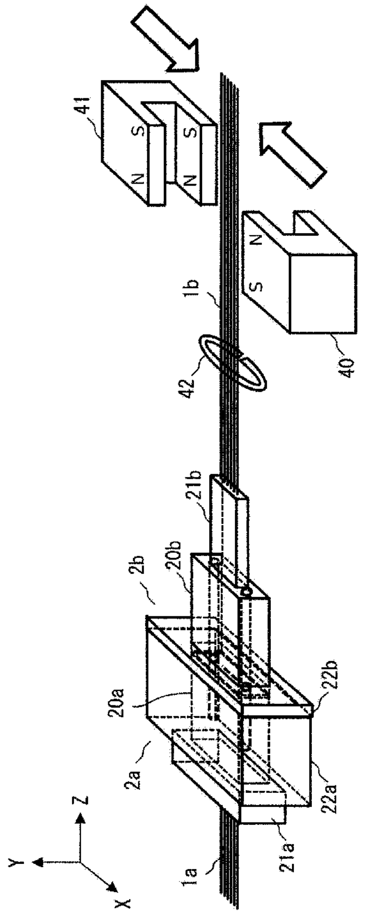
FIGS. 4A and 4B are diagrams for illustrating a method for attaching a third magnetic structure according to the first example of embodiments of the present invention.
Figure 4B:
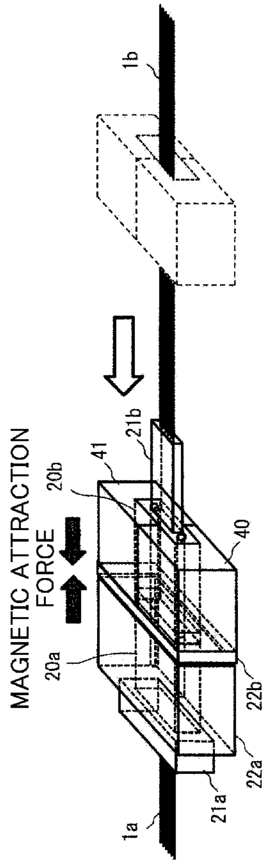

It is preferable that the magnetic structures 40 and 41 and the magnetic structure 22*b* be gradually brought closer to each other via a jig or a ring component 42 shown in FIG. 4A so that they do not suddenly collide with each other. By avoiding sudden collision, chipping of the magnetic structures 40 and 41 can be prevented.

When the magnetic structure 22*b* and the magnetic structures 40 and 41 are coupled together, a magnetic attraction force also acts between the magnetic structures 22*a* and 22*b*. Since the length of the magnetic structure 22*b* in the Z axis direction is short, a sufficient magnetic attraction force acts between the magnetic structures 22*a* and 22*b*. Thus, a force is applied to press the connection end faces of the ferrules 20*a* and 20*b* integrated with the magnetic structures 22*a* and 22*b* and simultaneously press the connection end faces of the optical fibers 1*a* and 1*b* protruding from the ferrules 20*a* and 20*b*.

Sizes of each of the magnetic structures 22*a*, 22*b*, 40, and 41, a gap between the magnetic structures 22*a* and 22*b*, and materials of the magnetic structures 22*a*, 22*b*, 40, and 41 are set so that the magnetic attraction force becomes 10 N, for example, and thus the connection end faces of the optical fibers 1*a* and 1*b* can be pressed against each other in the same manner as the MT connector or the MPO connector. In this way, a PC connection can be realized.

Also, in the structures shown in FIGS. 1A, 1B, 2, 3A, 3B, 4A, and 4B, the magnetic structures 22*a*, 22*b*, 40, and 41 are disposed to surround the peripheries of the ferrules 20*a* and 20*b*, but any structure other than that shown in FIGS. 1A, 1B, 2, 3A, 3B, 4A, and 4B may be used as long as it can generate a magnetic force. For example, the magnetic structure may be disposed only on one side of the ferrules 20*a* and 20*b*.

Further, the magnetic structures 40 and 41 may be formed of two or more hard magnetic materials, for example, multipole magnets having four poles, eight poles, or the like, instead of a combination of two half-split structures.

Also, for the magnetic structures 22*a* and 22*b*, any structure can be used as long as it is within a range satisfying the requirements of embodiments of the present invention, and two or more structures may be combined together.

Figure 5A:
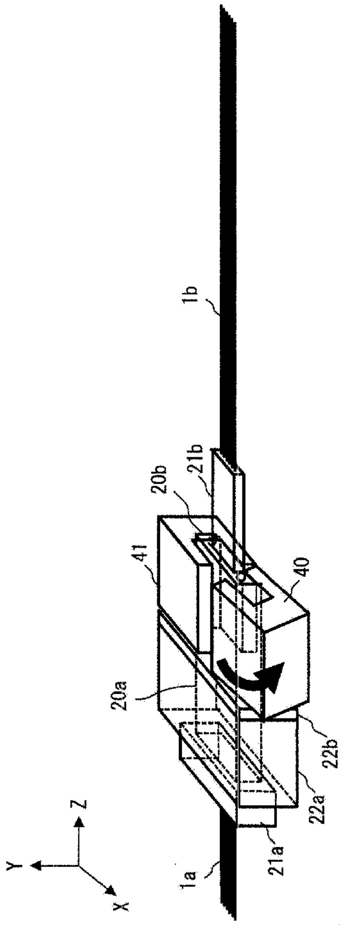
FIGS. 5A and 5B are diagrams for illustrating a method for removing the third magnetic structure according to the first example of embodiments of the present invention.

Next, a method for removing the magnetic structures 40 and 41 will be described with reference to FIGS. 5A and 5B. When the connection between the optical connectors 2*a* and 2*b* is released, the magnetic structures 40 and 41 are first removed. In order to remove the magnetic structures 40 and 41, as shown in FIG. 5A, by applying a force in a direction different from the longitudinal direction (Z axis direction) of the optical fibers 1*a* and 1*b* to the magnetic structures 40 and 41, the connection with the magnetic structure 22*b* can be released with a smaller force than when the magnetic structures 40 and 41 are pulled in the Z axis direction. Also, although FIG. 5A shows an example in which the magnetic structures 40 and 41 are removed by rotating the magnetic structures 40 and 41 around the z axis, the method is not limited to this method. The magnetic structures 40 and 41 may be removed by pulling them in an X direction or by rotating them around a Y axis, and in any case, the connection with the magnetic structure 22*b* can be released by a smaller force than when the magnetic structures 40 and 41 are pulled in the Z axis direction.

Figure 5B:
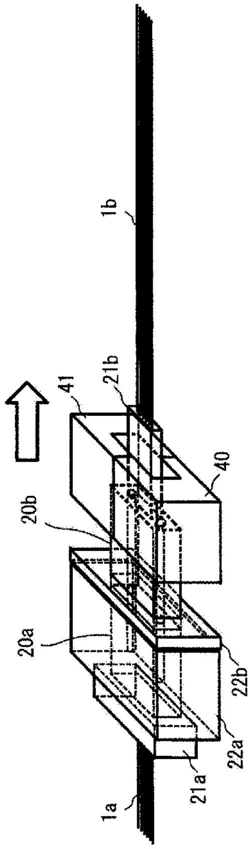

The magnetic structures 40 and 41 may be removed as they are, or they may be retreated to positions separated from the magnetic structure 22*b* as shown in FIG. 5B. By removing the magnetic structures 40 and 41 from the magnetic structure 22*b*, the magnetic attraction force between the magnetic structures 22*a* and 22*b* is eliminated, and thus the connection between the ferrules 20*a* and 20*b* can be released by a jig or manual work.

In the present example, attachment and detachment of the connection end faces of the ferrules 20*a* and 20*b* and attachment and detachment of the magnetic structures 40 and 41 can be performed in separate steps, and thus attaching and detaching work of the optical connectors 2*a* and 2*b* can be easily performed.

In the known configuration disclosed in NPL 1, the magnetic structures integrated with the ferrules are magnets. For this reason, in order to release the connection between the ferrules, it is necessary to apply a force larger than a magnetic attraction force acting between the magnetic structures integrated with the ferrules in a direction opposite thereto to separate the two ferrules. However, in a case in which the magnetic attraction force is, for example, about 10 N, it is necessary to apply a large force using a dedicated jig or the like, and the connection is hardly released. Further, when the two ferrules are separated from each other, an excessive force is applied to the ferrules and the guide pins, and thus there is a possibility that the ferrules and the guide pins may be deformed and broken.

On the other hand, in the present example, when the connection between the optical connectors 2*a* and 2*b* is released, the connection between the ferrules 20*a* and 20*b* can be released after the magnetic structures 40 and 41 are removed, and thus the connection can be released by a small force, and workability at the time of disconnection can be improved.

Further, in the known configuration disclosed in NPL 1, when the ferrules are connected to each other, it is necessary to fit guide pins into guide pin holes of the ferrules while a large magnetic attraction force acts between the magnetic structures integrated with the ferrules, and there is also a problem with workability at the time of connection. In addition, there is a possibility that the magnetic structures may be chipped due to strong collision between the magnetic structures, and there is also a possibility that powder of the magnetic structures may adhere to the connection end faces of the ferrules, and the optical characteristics may deteriorate.

On the other hand, in the present example, by forming the magnetic structures 40 and 41 to be attached later, there is no need to worry about the magnetic attraction force between the magnetic structures 22*a* and 22*b* when the ferrules 20*a* and 20*b* are connected to each other, and thus workability at the time of connection can be improved. The magnetic structures 40 and 41 are attached after the ferrules 20*a* and 20*b* are connected to each other, but they are not connected simultaneously with the connection between the ferrules 20*a* and 20*b*, and thus sudden collision between the magnetic structure 22*b* and the magnetic structures 40 and 41 can be easily prevented by using a jig, the ring component 42, or the like.

In addition, in the present example, even if chipped powder of the magnetic structures 40 and 41 is generated, there is a low possibility of the powder adhering to the connection end faces of the ferrules 20*a* and 20*b* after the connection between the ferrules 20*a* and 20*b* is completed, and there is a low possibility that the optical characteristics may deteriorate.

Next, other constituent elements of embodiments of the present invention will be described. In embodiments of the present invention, any known types and materials of the optical fibers 1*a* and 1*b* and any known types and materials of the ferrules 20*a* and 20*b* can be adopted. For example, the optical fibers 1*a* and 1*b* may be either well-known quartz-based optical fibers or plastic fibers. Also, as for the optical fibers 1*a* and 1*b*, embodiments of the present invention can be applied to any of single mode fibers, multimode fibers, polarization holding fibers, photonic crystal fibers, multicore fibers, and the like.

Further, in portions exposed to the outside of the ferrules 20*a* and 20*b*, known resin coatings made of, for example, acrylic, epoxy, silicone, polyimide, or the like are provided at the peripheries of the optical fibers 1*a* and 1*b*, and silicone tubes, nylon coatings, or the like may be provided in two or more layers around the resin coatings. Also, polymer waveguides may be used instead of the optical fibers 1*a* and 1*b*.

Any of general-purpose plastics, engineering plastics, super engineering plastics, or the like, which are often used for MT ferrules, may be used for the material of the ferrules 20*a* and 20*b*.

Also, glass materials may be used with the same structures as the ferrules 20*a* and 20*b*, or a processed product based on a semiconductor material such as silicon, a ceramic material, or the like may be used. For example, as in a known optical fiber array, the optical fibers 1*a* and 1*b* may be held and fixed between a glass block formed with a V groove and a lid component. By positioning and bonding two guide pins or the like to the glass block and the lid component, a ferrule made of a glass material having a positioning structure may be realized.

In addition, external shapes of the ferrules 20*a* and 20*b* and external shapes of the magnetic structures 22*a*, 22*b*, 40, and 41 may be different from those shown in FIGS. 1A, 1B, 2, 3A, 3B, 4A, 4B, 5A, and 5B. Also, if necessary, the ferrules 20*a* and 20*b* and the magnetic structures 22*a*, 22*b*, 40, and 41 may be chamfered, filleted, or otherwise processed. These processes may be applied to other examples.

The 8-core optical fibers 1*a* and 1*b* are disposed at, for example, a pitch of approximately 250 μm. Naturally, the pitch and the number of cores of the optical fibers 1*a* and 1*b* are arbitrary, and any number of cores such as 2 cores, 4 cores, 8 cores, 12 cores, 16 cores, 24 cores, 32 cores, or the like can be adopted. A part of the optical fibers 1*a* and 1*b* may be a polarization holding fiber or the like.

In addition, in order to prevent the guide pins 3 from falling off, the guide pins 3 may be fixed to either one of the ferrules 20*a* and 20*b*. As a fixing method, there are a method of fixing by using other parts, and a method of using a bonding material, an adhesive, or the like.

Further, if necessary, openings of the guide pin holes 23*a* and 23*b*, openings of micro holes for the fibers of the ferrules 20*a* and 20*b*, and tips of the guide pins 3 may be tapered to facilitate insertion.

In the present example, a structure including the guide pins 3 and the guide pin holes 23*a* and 23*b* used in MT ferrules or the like is adopted as an alignment structure, but an alignment structure other than the present example may be used. For example, a protrusion may be formed on one connection end face of the ferrules 20*a* and 20*b*, and a guide groove fitted to the protrusion may be provided on the other connection end face.

In the present example, the opposing connection end faces of the ferrules 20*a* and 20*b*, the opposing connection end faces of the optical fibers 1*a* and 1*b*, and the opposing connection end faces of the magnetic structures 22*a* and 22*b* are perpendicular to the Z axis direction, but the connection end faces of the ferrules 20*a* and 20*b* and the connection end faces of the optical fibers 1*a* and 1*b* may be oblique end faces inclined by, for example, 8° with respect to an XY plane perpendicular to the Z axis direction. By forming the oblique end faces, almost no recombination of reflected return light into fiber cores occurs.

Further, the connection end faces of the magnetic structures 22*a* and 22*b* may also be inclined with respect to the XY plane perpendicular to the Z axis direction to be approximately parallel to the connection end faces of the ferrules 20*a* and 20*b* and the connection end faces of the optical fibers 1*a* and 1*b*. The end faces of the magnetic structures 40 and 41 may also be inclined.

In addition, in the present example, an example in which the connection end faces of the magnetic structures 22*a* and 22*b* and the connection end faces of the ferrules 20*a* and 20*b* are aligned on the same plane, or the connection end faces of the ferrules 20*a* and 20*b* are positioned to protrude from the connection end faces of the magnetic structures 22*a* and 22*b* has been described, but embodiments of the present invention are of course not limited thereto.

Figure 6A:
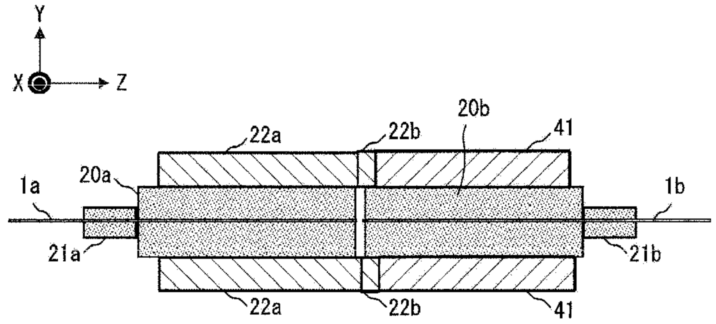
FIGS. 6A and 6B are cross-sectional views showing another example of the multicore optical connector connection structure according to the first example of embodiments of the present invention.
Figure 6B:
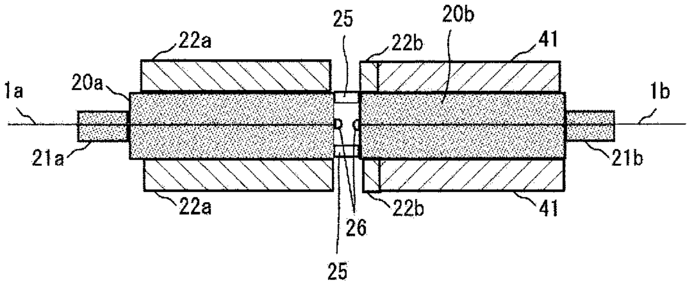

FIGS. 6A and 6B show a modified example of the present example. The example shown in FIG. 6A is configured such that the connection end faces of the ferrules 20*a* and 20*b* are positioned to be slightly recessed from the connection end faces of the magnetic structures 22*a* and 22*b*, and a slight gap is provided between the optical fibers 1*a* and 1*b* while the opposing magnetic structures 22*a* and 22*b* are brought into contact with each other.

In the example shown in FIG. 6B, the connection end faces of the ferrules 20*a* and 20*b* are positioned to slightly protrude from the connection end faces of the magnetic structures 22*a* and 22*b*, but a spacer component 25 is disposed between the ferrules 20*a* and 20*b* in order to provide a gap between the optical fibers 1*a* and 1*b*. The optical fibers 1*a* and 1*b* are optically connected to each other via two micro lenses 26. Also, a configuration of realizing the PC connection by positioning the ferrule 20*a* to be recessed with respect to the connection end face of one magnetic structure 22*a*, positioning the ferrule 20*b* to protrude from the connection end face of the other magnetic structure 22*b*, and appropriately setting a depth of a recess of the ferrule 20*a* and a length of a protrusion of the ferrule 20*b* may be provided.

Next, a method for joining the ferrules 20*a* and 20*b* and the magnetic structures 22*a* and 22*b* will be described. As described above, the ferrules 20*a* and 20*b* and the magnetic structures 22*a* and 22*b* are integrated with each other by an arbitrary joining method such as adhesion, mechanical fitting, and metal joining (such as soldering). In order to determine a positional relation between the ferrules 20*a* and 20*b* and the magnetic structures 22*a* and 22*b*, it is preferable to provide a positioning structure.

Figure 7A:
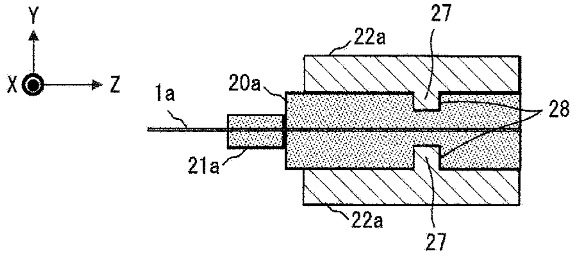
FIGS. 7A to 7C are cross-sectional views for illustrating a method for joining a first magnetic structure and a ferrule according to the first example of embodiments of the present invention.
Figure 7B:
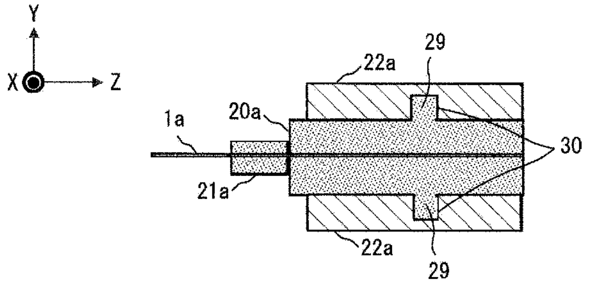
Figure 7C:
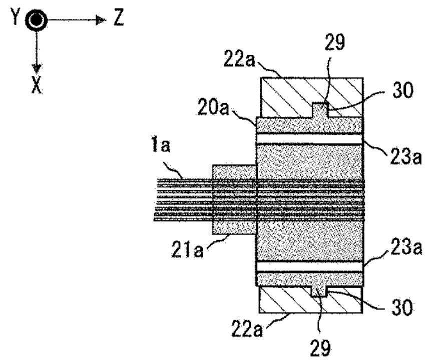

For example, in the example shown in FIG. 7A, the magnetic structure 22*a* is provided with protrusions 27, and the ferrule 20*a* is provided with grooves 28 fitted to the protrusions 27. The protrusions 27 and the grooves 28 form a positioning structure. On the other hand, in the examples of FIGS. 7B and 7C, protrusions 29 are provided in the ferrule 20*a*, and grooves 30 fitted to the protrusions 29 are provided in the magnetic structure 22*a*. The protrusions 29 and the grooves 30 form a positioning structure.

In this way, by providing the positioning structure in the ferrule 20*a* and the magnetic structure 22*a*, it is possible to ensure positioning accuracy of the ferrule 20*a* and the magnetic structure 22*a* in the Z axis direction. Further, by providing a groove in the ferrule 20*a* or the magnetic structure 22*a*, it is possible to increase fixing strength between the ferrule 20*a* and the magnetic structure 22*a* when a magnetic force, or an insertion or extraction force, is applied from the outside.

Figure 8A:
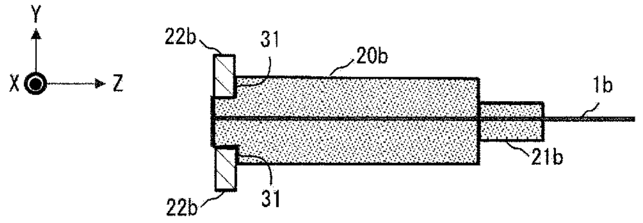
FIGS. 8A to 8C are cross-sectional views for illustrating a method for joining a second magnetic structure and a ferrule according to the first example of embodiments of the present invention.
Figure 8B:
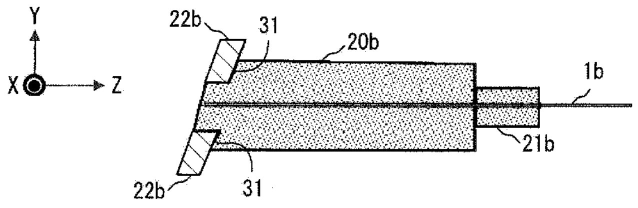
Figure 8C:
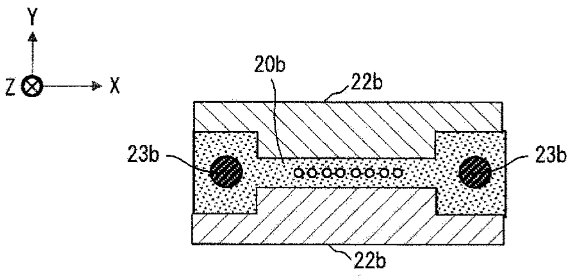

FIGS. 8A, 8B, and 8C show other modified examples of the present example. In the examples of FIGS. 8A and 8B, grooves 31 (a positioning structure) are formed in advance on an outer peripheral portion of the connection end face of the ferrule 20*b*, and the magnetic structure 22*b* is fitted into the grooves 31. FIG. 8A shows a case in which the connection end face of the magnetic structure 22*b* is perpendicular to the Z axis direction, and FIG. 8B shows a case in which the connection end face of the magnetic structure 22*b* is inclined with respect to the XY plane perpendicular to the Z axis direction.

In this way, by providing the positioning structure in the ferrule 20*b* similarly to the case of the ferrule 20*a*, it is possible to ensure positioning accuracy of the ferrule 20*b* and the magnetic structure 22*b* in the Z axis direction, and thus it is possible to increase fixing strength between the ferrule 20*b* and the magnetic structure 22*b*.

In the example of FIG. 8C, the ferrule 20*b* and the magnetic structure 22*b* are integrated with each other by an insert molding technique for embedding the magnetic structure 22*b* at the time of molding the ferrule 20*b*. Also, the cross-section of FIG. 8C is an example, and a cross-sectional shape after the insert molding is not limited thereto.

Figure 9A:
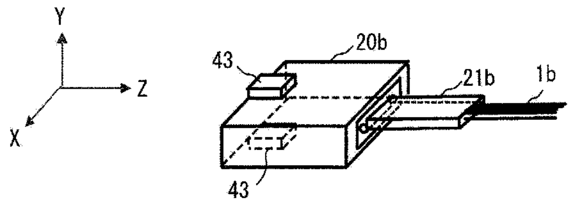
FIGS. 9A to 9D are diagrams for illustrating a method for positioning the third magnetic structure and a ferrule according to the first example of embodiments of the present invention.
Figure 9B:
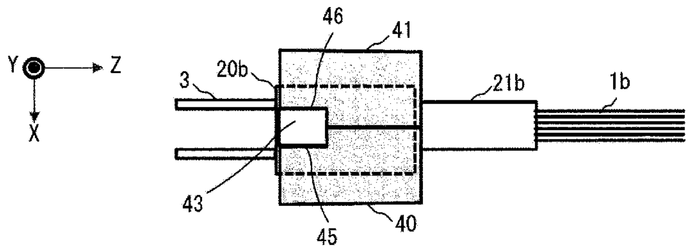

FIGS. 9A to 9D show other modified examples of the present example. In the example of FIG. 9A, protrusions 43 are provided at two upper and lower positions of the ferrule 20*b*. In the example of FIG. 9B, magnetic structures 40 and 41 in which grooves 45 and 46 fitted to the protrusions 43 are formed are attached to the ferrule 20*b*. The protrusions 43 and the grooves 45 and 46 form a positioning structure for determining the positional relation between the ferrule 20*b* and the magnetic structures 40 and 41.

Figure 9C:
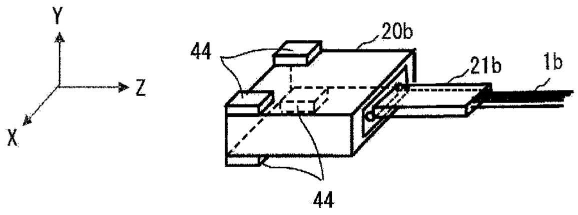
Figure 9D:
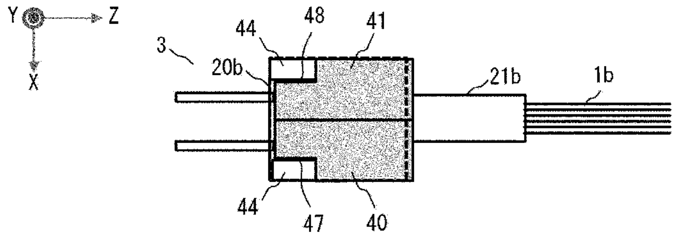

In the example of FIG. 9C, protrusions 44 are provided at four upper and lower positions of the ferrule 20*b*. In the example of FIG. 9D, magnetic structures 40 and 41 in which grooves 47 and 48 fitted to the protrusions 44 are formed are attached to the ferrule 20*b*. The protrusions 44 and the grooves 47 and 48 form a positioning structure for determining the positional relation between the ferrule 20*b* and the magnetic structures 40 and 41.

In the configurations shown in FIGS. 9A to 9D, since the ferrule 20*b* is not provided with the magnetic structure 22*b*, the magnetic structures 40 and 41 serve as the second magnetic structure connected to the magnetic structure 22*a* (first magnetic structure) integrated with the ferrule 20*a*. It is not necessary to fix the magnetic structures 40 and 41 to the ferrule 20*b*. After the ferrules 20*a* and 20*b* are connected to each other, the magnetic structures 40 and 41 may be fitted to the ferrule 20*b*. By forming the magnetic structures 40 and 41 to be attached later, there is no need to worry about the magnetic attraction force between the magnetic structures 22*a* and the magnetic structures 40 and 41 when the ferrules 20*a* and 20*b* are connected to each other, and thus workability at the time of connection can be improved. As described above, the magnetic structures 40 and 41 may not be a combination of two half-split structures but may be a combination of two or more hard magnetic materials.

Second Example

Figure 10A:
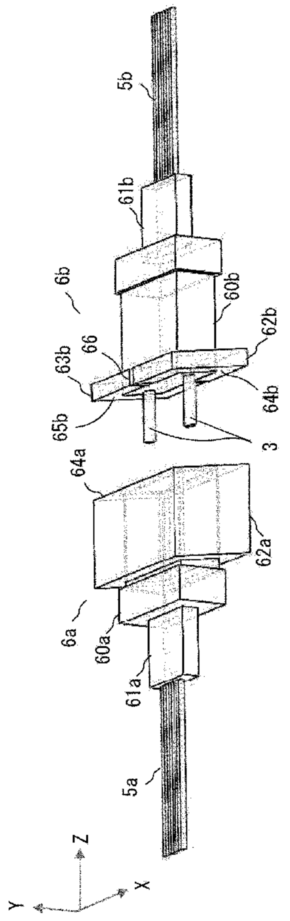
FIG. 10A is a perspective view of a multicore optical connector connection structure according to a second example of embodiments of the present invention before ferrule connection.
Figure 10B:
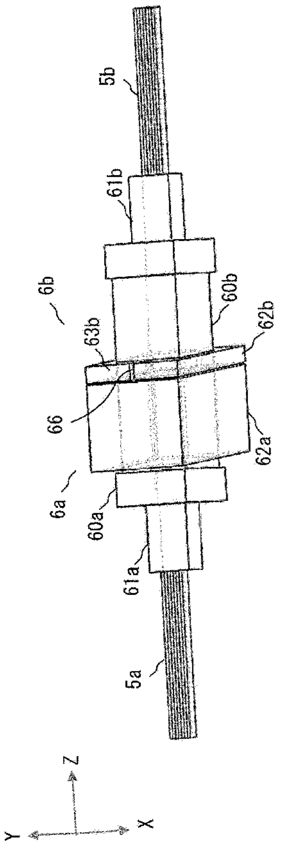
FIG. 10B is a perspective view of the multicore optical connector connection structure according to the second example of embodiments of the present invention after the ferrule connection.
Figure 11:
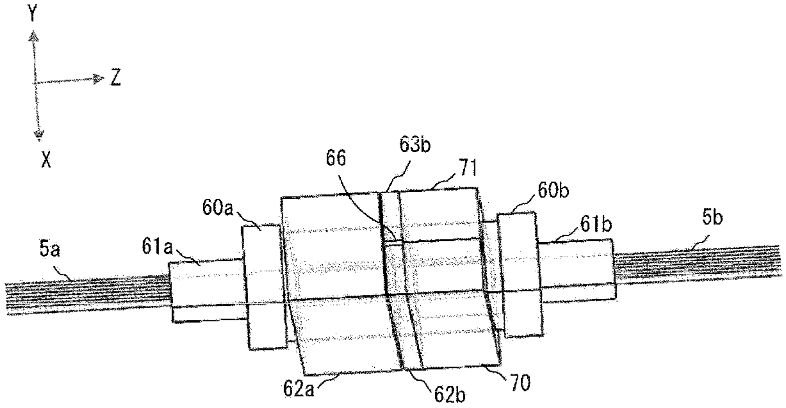
FIG. 11 is a perspective view showing a state in which magnets are attached after the ferrule connection of the multicore optical connector connection structure according to the second example of embodiments of the present invention.

FIG. 10A is a perspective view of a multicore optical connector connection structure according to a second example of embodiments of the present invention before ferrule connection, and FIG. 10B is a perspective view of the multicore optical connector connection structure after the ferrule connection. FIG. 11 is a perspective view showing a state in which magnets are attached after the ferrule connection of the multicore optical connector connection structure.

The multicore optical connector connection structure of the present example includes an optical connector 6*a* attached to tips of a plurality of optical fibers 5*a*, an optical connector 6*b* attached to tips of a plurality of optical fibers 5*b*, and guide pins 3 that connect ferrules of the optical connectors 6*a* and 6*b* to each other.

The optical connector 6*a* includes a ferrule 60*a* (the first alignment component) attached to the tips of the optical fibers 5*a*, a boot 61*a* that bundles the optical fibers 5*a*, and a magnetic structure 62*a* (the first magnetic structure) attached to a periphery of the ferrule 60*a*. Similarly, the optical connector 6*b* includes a ferrule 60*b* (the second alignment component) attached to the tips of the optical fibers 5*b*, a boot 61*b* that bundles the optical fibers 5*b*, and magnetic structures 62*b* and 63*b* (the second magnetic structure) attached to a periphery of the ferrule 60*b*.

The optical fibers 5*a* and 5*b* are 8-core quartz single mode fibers similar to the optical fibers 1*a* and 1*b*. The ferrules 60*a* and 60*b* are multi-core ferrules similar to the ferrules 20*a* and 20*b*. The optical fibers 5*a* and 5*b* are positioned to slightly protrude from connection end faces of the ferrules 60*a* and 60*b*, and connection end faces of the optical fibers 5*a* and 5*b* are polished.

A connection end face 64*a* of the magnetic structure 62*a* and the connection end face of the ferrule 60*a* are positioned to be aligned on the same plane, but the connection end face of the ferrule 60*a* may be positioned to protrude from the connection end face 64*a* of the magnetic structure 62*a*. Similarly, connection end faces 64*b* and 65*b* of the magnetic structures 62*b* and 63*b* and the connection end face of the ferrule 60*b* are positioned to be aligned on the same plane, but the connection end face of the ferrule 60*b* may be positioned to protrude from the connection end faces 64*b* and 65*b* of the magnetic structures 62*b* and 63*b*.

In the present example, the connection end faces of the ferrules 60*a* and 60*b* and the connection end faces of the optical fibers 5*a* and 5*b* are inclined by, for example, 8° with respect to an XY plane perpendicular to a longitudinal direction (a Z axis direction) of the optical fibers 5*a* and 5*b*.

The connection end face 64*a* of the magnetic structure 62*a* opposing the magnetic structures 62*b* and 63*b* is inclined by 8° with respect to the XY plane perpendicular to the Z axis direction to be approximately parallel to the connection end face of the ferrule 60*a* integrated with the magnetic structure 62*a* and the connection end faces of the optical fibers 5*a*. Similarly, the connection end faces 64*b* and 65*b* of the magnetic structures 62*b* and 63*b* opposing the magnetic structure 62*a* are inclined by 8° with respect to the XY plane to be approximately parallel to the connection end face of the ferrule 60*b* integrated with the magnetic structures 62*b* and 63*b* and the connection end faces of the optical fibers 5*b*.

The magnetic structures 62*b* and 63*b* are set to be shorter in the Z axis direction than the magnetic structure 62*a* and the ferrules 60*a* and 60*b*.

In the present example, as shown in FIG. 10A, the guide pins 3 are inserted one by one into two guide pin holes of the ferrule 60*b* of the optical connector 6*b*, these guide pins 3 are inserted into guide pin holes of the ferrule 60*a* of the optical connector 6*a*, the connection end faces of the ferrules 60*a* and 60*b* are butted against each other, and the connection end faces of the optical fibers 5*a* and 5*b* are butted against each other, thereby connecting the optical connectors 6*a* and 6*b* to each other.

All of the magnetic structures 62*a*, 62*b*, and 63*b* are made of a soft magnetic material. For a method for joining the ferrules 60*a* and 60*b* and the magnetic structures 62*a*, 62*b*, and 63*b*, any joining method such as adhesion, mechanical fitting, or metal joining (such as soldering) may be used.

In the present example, magnetic structures 70 and 71 (the third magnetic structure) are disposed on end face sides opposite to the connection end faces 64*b* and 65*b* of the magnetic structures 62*b* and 63*b*. End faces of the magnetic structures 70 and 71 are inclined by 8° with respect to the XY plane perpendicular to the Z axis direction to be approximately parallel to the end faces of the magnetic structures 62*b* and 63*b*.

The magnetic structures 70 and 71 are made of hard magnetic materials (so-called magnets). Magnetization directions of N poles and S poles of the magnetic structures 70 and 71 are set in the Z axis direction.

Similarly to the first example, the magnetic structures 70 and 71 are made of hard magnetic materials each having a half-split structure obtained by dividing a square cylinder into halves. By combining the magnetic structures 70 and 71 to be formed into a square cylinder shape, a part of the ferrule 60*b* can be housed inside the cylinder. As described above, the magnetization directions of the N and S poles of the magnetic structures 70 and 71 are set in the Z axis direction, but the magnetization directions of the N and S poles are set to be opposite to each other so that they are integrated with each other by a magnetic attraction force. For example, the magnetization direction of the magnetic structure 70 is set so that the S pole and the N pole are arranged in order in the Z axis direction from the magnetic structures 62*b* and 63*b* side, while the magnetization direction of the magnetic structure 71 is set so that the N pole and the S pole are arranged in order in the Z axis direction from the magnetic structures 62*b* and 63*b* side.

A difference from the first example is that the second magnetic structure integrated with the ferrule 60*b* is divided into two. The magnetic structures 62*b* and 63*b* are each made of a soft magnetic material of a half-split structure obtained by dividing a square cylinder into halves. By combining the magnetic structures 62*b* and 63*b* to be formed into a square cylinder shape, a form in which a periphery of the connection end face of the ferrule 60*b* is surrounded by the magnetic structures 62*b* and 63*b* is obtained.

However, as shown in FIGS. 10A, 10B, and 11, when integrated with the ferrule 60*b*, the two magnetic structures 62*b* and 63*b* are disposed to be separated from each other without being in contact with each other. Accordingly, a gap 66 filled with air is formed between the magnetic structures 62*b* and 63*b*.

In the present example, similarly to the first example, attachment and detachment of the connection end faces of the ferrules 60*a* and 60*b* and attachment and detachment of the magnetic structures 70 and 71 can be performed in separate steps, and thus attaching and detaching work of the optical connectors 6*a* and 6*b* can be easily performed. When the connection between the optical connectors 6*a* and 6*b* is released, the connection between the ferrules 60*a* and 60*b* is released after the magnetic structures 70 and 71 are removed, and thus the connection can be released with a small force, and workability at the time of disconnection can be improved.

In addition, in the present example, by forming the magnetic structures 70 and 71 to be attached later, there is no need to worry about the magnetic attraction force between the magnetic structures 62*a*, 62*b*, and 63*b* when the ferrules 60*a* and 60*b* are connected to each other, and thus workability at the time of connection can be improved. The magnetic structures 70 and 71 are attached after the ferrules 60*a* and 60*b* are connected to each other, but the attachment is not performed simultaneously with the connection of the ferrules 60*a* and 60*b*, and thus sudden collision of the magnetic structures 62*b* and 63*b* with the magnetic structures 70 and 71 can be easily prevented by using a jig, the above-mentioned ring component, or the like.

In addition, in the present example, even if chipped powder of the magnetic structures 70 and 71 is generated, there is a low possibility of the powder adhering to the connection end faces of the ferrules 60*a* and 60*b* after the connection of the ferrules 60*a* and 60*b* is completed, and thus there is a low possibility that the optical characteristics may deteriorate.

Further, in the present example, by providing the gap 66 between the magnetic structures 62*b* and 63*b*, the magnetic attraction force acting between the magnetic structures 62*a*, 62*b*, and 63*b* can be strengthened. The reason why the magnetic attraction force increases will be described in detail below.

Usually, a magnetic attraction force acts between a hard magnetic material and a soft magnetic material. The magnetic attraction force is stronger when the magnetic structure 62*a* made of a soft magnetic material and the magnetic structures 70 and 71 made of a hard magnetic material are directly attached to each other. On the other hand, in the present example, since thin magnetic structures 62*b* and 63*b* made of a soft magnetic material are present between the magnetic structure 62*a* and the magnetic structures 70 and 71, the magnetic attraction force is reduced. Generally, the longer the magnetic structures 62*b* and 63*b* are, the lower the magnetic attraction force is, and thus it is required to set lengths of the magnetic structures 62*b* and 63*b* in the Z axis direction as short as possible.

Figure 12A:
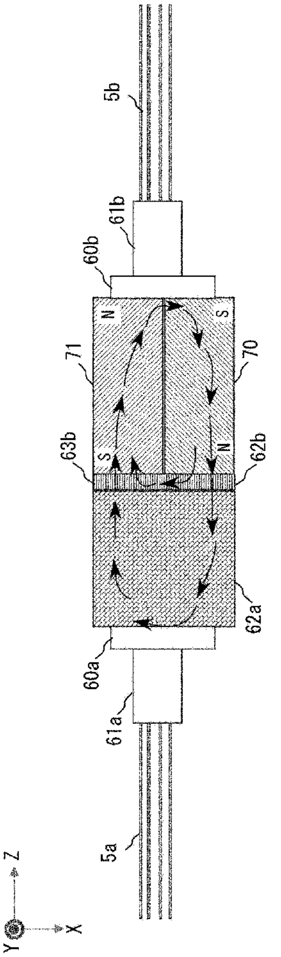
FIG. 12A is a cross-sectional view showing magnetic flux density vectors when there is no gap in the second magnetic structure of the multicore optical connector connection structure.

The reason why the magnetic attraction force is reduced will be described with reference to FIG. 12A. FIG. 12A is a cross-sectional view showing magnetic flux density vectors when there is no gap between the magnetic structures 62*b* and 63*b*. When there is no gap between the magnetic structures 62*b* and 63*b*, a loop of a magnetic circuit is closed in the magnetic structures 62*b* and 63*b* as shown in FIG. 12A. This results in a reduction in the magnetic attraction force between the magnetic structure 62*a* and the magnetic structures 62*b* and 63*b*.

Figure 12B:
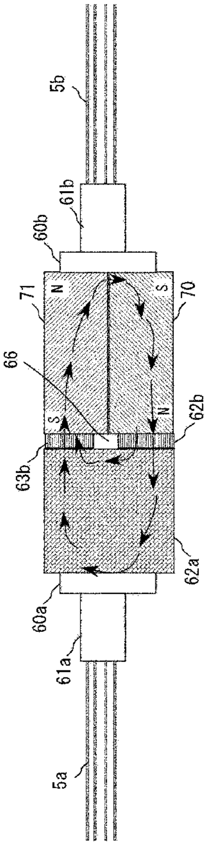
FIG. 12B is a cross-sectional view showing magnetic flux density vectors in the multicore optical connector connection structure according to the second example of embodiments of the present invention.

On the other hand, FIG. 12B is a cross-sectional view showing magnetic flux density vectors when the gap 66 is provided between the magnetic structures 62*b* and 63*b* as in the present example. By providing the gap 66 filled with air between the magnetic structures 62*b* and 63*b*, the loop of the magnetic circuit returns from the magnetic structures 70 and 62*b* to the magnetic structures 63*b* and 71 side via the magnetic structure 62*a* as shown in FIG. 12B. Accordingly, in the present example, the magnetic attraction force acting between the magnetic structures 62*a*, 62*b*, and 63*b* can be strengthened.

As is apparent from FIG. 12B, it is required to provide the gap 66 in the vicinity of a connection portion between the two half-split magnetic structures 70 and 71. In actual simulations, according to the configuration of the present example, it also has been confirmed that, by providing the gap 66 with a width of 0.4 mm, the reduction of the magnetic attraction force can be prevented as compared to the case in which there is no gap 66.

As described above, in the present example, it is possible to realize the optical connector connection structure in which the workability of the attachment and detachment of the optical connectors 6*a* and 6*b* is improved, and by minimizing the reduction in the magnetic attraction force between the magnetic structure 62*a* and the magnetic structures 62*b* and 63*b*, a sufficient pressing force is generated between the connection end faces of the ferrules 60*a* and 60*b*.

In addition, although FIGS. 10A, 10B, 11, 12A, and 12B show an example in which the gap 66 and the connection portion between the magnetic structures 70 and 71 are provided on upper and lower surfaces (on the XZ plane) of the ferrule 60*b*, the positions at which the gap 66 and the connection portion between the magnetic structures 70 and 71 are provided are arbitrary. For example, the gap 66 and the connection portion between the magnetic structures 70 and 71 may be provided on both side surfaces (on YZ plane sides) of the ferrule 60*b*.

Also, the gap 66 may be filled with a nonmagnetic material instead of air. In addition, the magnetic structures 62*b* and 63*b* may not be two half-split structures, but they may be formed by combining two or more soft magnetic materials together and disposing these soft magnetic materials around the ferrule 60*b* in a form in which they are separated from each other via a gap filled with air or a nonmagnetic material.

Third Example

Figure 13A:
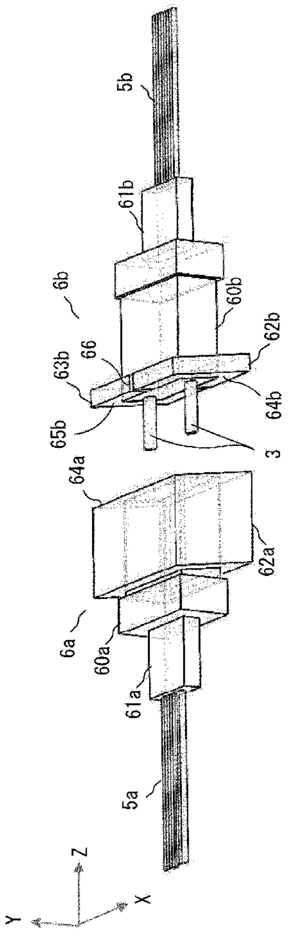
FIG. 13A is a perspective view of a multicore optical connector connection structure according to a third example of embodiments of the present invention before ferrule connection.
Figure 13B:
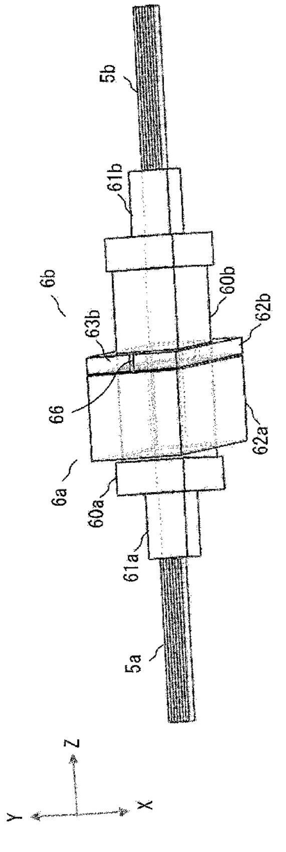
FIG. 13B is a perspective view of the multicore optical connector connection structure according to the third example of embodiments of the present invention after the ferrule connection.
Figure 14:
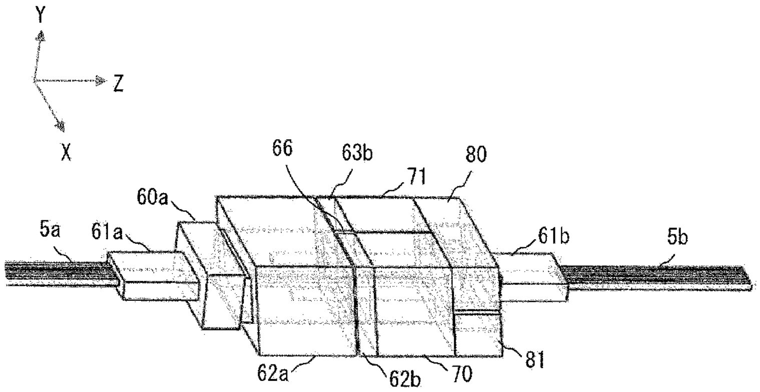
FIG. 14 is a perspective view showing a state in which magnets are attached after the ferrule connection of the multicore optical connector connection structure according to the third example of embodiments of the present invention.

FIG. 13A is a perspective view of a multicore optical connector connection structure according to a third example of embodiments of the present invention before ferrule connection, and FIG. 13B is a perspective view of the multicore optical connector connection structure after the ferrule connection. FIG. 14 is a perspective view showing a state in which magnets are attached after the ferrule connection of the multicore optical connector connection structure.

The optical connectors 6*a* and 6*b* have the same configuration as in the second example. A difference from the second example is that after the magnetic structures 70 and 71 are attached as described above, magnetic structures 80 and 81 (a fourth magnetic structure) are further attached to end face sides opposite to the connection end faces of the magnetic structures 70 and 71 connected to the magnetic structures 62*b* and 63*b*. The end faces of the magnetic structures 80 and 81 are inclined by 8° with respect to the XY plane perpendicular to the longitudinal direction (Z axis direction) of the optical fibers 5*a* and 5*b* to be approximately parallel to the end faces of the magnetic structures 70 and 71.

The magnetic structures 80 and 81 are made of soft magnetic materials and function as so-called yokes. Similarly to the magnetic structures 70 and 71, the magnetic structures 80 and 81 are made of soft magnetic materials each having a half-split structure obtained by dividing a square cylinder into halves. By combining the magnetic structures 80 and 81 to be formed into a square cylinder shape, a form in which a periphery of the end face on the boot 61*b* side of the ferrule 60*b* is surrounded by the magnetic structures 80 and 81 is obtained. By forming the magnetic structures 80 and 81 into two half-split structures, the magnetic structures 80 and 81 can be attached after the magnetic structures 70 and 71 have been attached.

Also, the fourth magnetic structure may be made of a square cylindrical soft magnetic material instead of using two half-split soft magnetic materials. In this case, if the optical fibers 5*b* are prepared in advance to fit in the cylinder of the fourth magnetic structure, the fourth magnetic structure can be attached after the magnetic structures 70 and 71 have been attached.

Further, when the fourth magnetic structure is made of two half-split soft magnetic materials as in the present example, the reduction in the magnetic attraction force between the magnetic structure 62*a* and the magnetic structures 62*b* and 63*b* can be inhibited by changing a connection position between the magnetic structures 70 and 71 and a connection position between the magnetic structures 80 and 81.

For example, as shown in the example of FIG. 14, in the case of a configuration in which the magnetic structures 70 and 71 are opposed to each other with the YZ plane as a boundary, the magnetic structures 80 and 81 may be opposed to each other with the XZ plane as a boundary. On the contrary, in the case of a configuration in which the magnetic structures 70 and 71 are opposed to each other with the XZ plane as a boundary, the magnetic structures 80 and 81 may be opposed to each other with the YZ plane as a boundary. In this way, by changing the connection position between the magnetic structures 70 and 71 and the connection position between the magnetic structures 80 and 81, the loop of the magnetic circuit can be efficiently confined.

In the present example, attachment and detachment of the connection end faces of the ferrules 60*a* and 60*b* and attachment and detachment of the magnetic structures 70, 71, 80, and 81 can be performed in separate steps, and thus attaching and detaching work of the optical connectors 6*a* and 6*b* can be easily performed. When the connection of the optical connectors 6*a* and 6*b* is released, the connection of the ferrules 60*a* and 60*b* can be released after the magnetic structures 70 and 71 have been removed, and thus the connection can be released with a small force, and workability at the time of disconnection can be improved.

In the present example, by forming the magnetic structures 70 and 71 to be attached later, there is no need to worry about the magnetic attraction force between the magnetic structures 62*a*, 62*b*, and 63*b* when the ferrules 60*a* and 60*b* are connected to each other, and thus workability at the time of connection can be improved. The magnetic structures 70 and 71 are attached after the ferrules 60*a* and 60*b* have been connected to each other, but the attachment is not performed simultaneously with the connection of the ferrules 60*a* and 60*b*, and thus sudden collision of the magnetic structures 62*b* and 63*b* with the magnetic structures 70 and 71 can be easily prevented by using a jig, the above-mentioned ring component, or the like.

In addition, in the present example, even if the chipped powder of the magnetic structures 70 and 71 is generated, there is a low possibility of the powder adhering to the connection end faces of the ferrules 60*a* and 60*b* after the connection of the ferrules 60*a* and 60*b* is completed, and thus there is a low possibility that the optical characteristics may deteriorate.

Further, in the present example, by attaching the magnetic structures 80 and 81 functioning as yokes to strengthen the confinement of the magnetic circuit, the magnetic attraction force between the magnetic structure 62*a* and the magnetic structures 62*b* and 63*b* can be increased. As a result, in the present example, the workability of the attachment and detachment of the optical connectors 6*a* and 6*b* can be improved, and a sufficient pressing force can be generated between the connection end faces of the ferrules 60*a* and 60*b*.

In addition, in the second and third examples, similarly to the first example, the connection end faces of the ferrules 60*a* and 60*b*, the connection end faces of the optical fibers 5*a* and 5*b*, and the end faces of the magnetic structures 62*a*, 62*b*, 63*b*, 70, 71, 80, and 81 may be perpendicular to the Z axis direction. Alternatively, the end faces of the magnetic structures 62*a*, 62*b*, 63*b*, 70, 71, 80, and 81 may be perpendicular to the Z-axis direction while the connection end faces of the ferrules 60*a* and 60*b* and the connection end faces of the optical fibers 5*a* and 5*b* are inclined with respect to the XY plane.

Also, in the present example, the magnetic structures 80 and 81 may not be two half-split structures, but may be formed by combining two or more soft magnetic materials and attaching the fourth cylindrical magnetic structure obtained by combining these soft magnetic materials to the periphery of the ferrule 60*b*.

Fourth Example

Figure 15A:
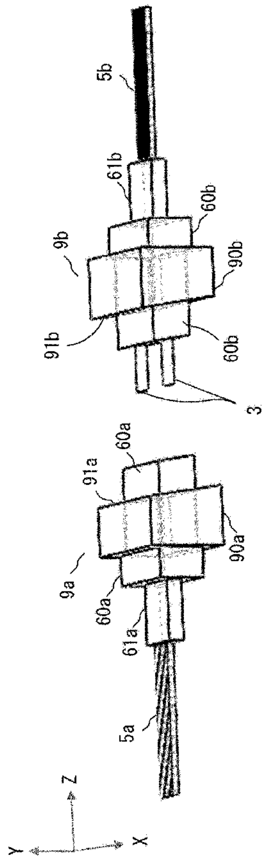
FIG. 15A is a perspective view of a multicore optical connector connection structure according to a fourth example of embodiments of the present invention before ferrule connection.
Figure 15B:
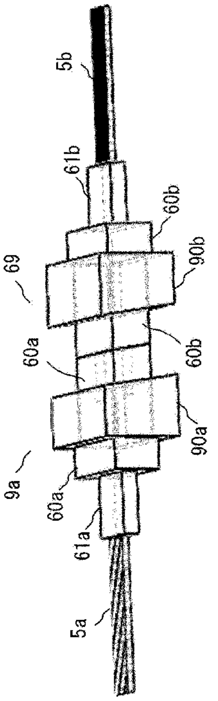
FIG. 15B is a perspective view of the multicore optical connector connection structure according to the fourth example of embodiments of the present invention after ferrule connection.
Figure 16:
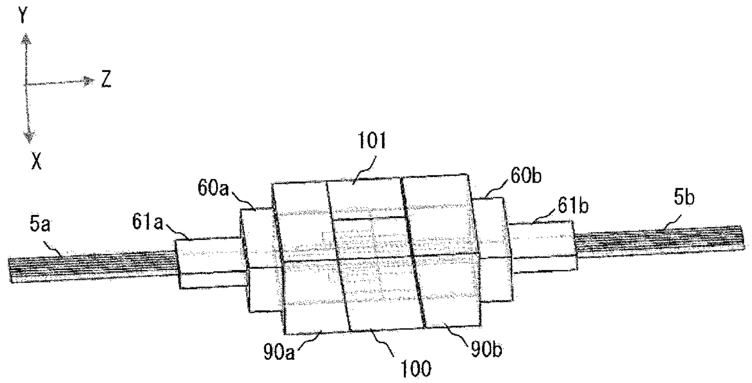
FIG. 16 is a perspective view showing a state in which magnets are attached after the ferrule connection of the multicore optical connector connection structure according to the fourth example of embodiments of the present invention.

FIG. 15A is a perspective view of a multicore optical connector connection structure according to a fourth example of embodiments of the present invention before ferrule connection, and FIG. 15B is a perspective view of the multicore optical connector connection structure after the ferrule connection. FIG. 16 is a perspective view showing a state in which magnets are attached after the ferrule connection of the multicore optical connector connection structure.

The multicore optical connector connection structure of the present example includes an optical connector 9*a* attached to tips of a plurality of optical fibers 5*a*, an optical connector 9*b* attached to tips of a plurality of optical fibers 5*b*, and guide pins 3 that connect ferrules of the optical connectors 9*a* and 9*b* to each other.

The optical connector 9*a* includes a ferrule 60*a* (the first alignment component) attached to the tips of the optical fibers 5*a*, a boot 61*a* that bundles the optical fibers 5*a*, and a magnetic structure 90*a* (the first magnetic structure) attached to a periphery of the ferrule 60*a*. Similarly, the optical connector 9*b* includes a ferrule 60*b* (the second alignment component) attached to the tips of the optical fibers 5*b*, a boot 61*b* that bundles the optical fibers 5*b*, and a magnetic structure 90*b* (the second magnetic structure) attached to a periphery of the ferrule 60*b*.

The magnetic structures 90*a* and 90*b* integrated with the ferrules 60*a* and 60*b* have almost the same lengths in the longitudinal direction (Z axis direction) of the optical fibers 1*a* and 1*b*. A connection end face 91*a* of the magnetic structure 90*a* opposing the magnetic structure 90*b* is inclined by 8° with respect to the XY plane perpendicular to the Z axis direction to be approximately parallel to a connection end face of the ferrule 60*a* integrated with the magnetic structure 90*a* and connection end faces of the optical fibers 5*a*. Similarly, a connection end face 91*b* of the magnetic structure 90*b* opposing the magnetic structure 90*a* is inclined by 8° with respect to the XY plane to be approximately parallel to a connection end face of the ferrule 60*b* integrated with the magnetic structure 90*b* and connection end faces of the optical fibers 5*b*.

In addition, the connection end face of the ferrule 60*a* is positioned to protrude from the connection end face 91*a* of the magnetic structure 90*a*, and the connection end face of the ferrule 60*b* is similarly positioned to protrude from the connection end face 91*b* of the magnetic structure 90*b*.

The magnetic structures 90*a* and 90*b* are both made of a soft magnetic material such as SUS403.

A difference from the first to third examples is that magnetic structures 100 and 101 (the third magnetic structures) are disposed between the magnetic structures 90*a* and 90*b*. Both connection end faces of the magnetic structures 100 and 101 opposing the magnetic structures 90*a* and 90*b* are inclined by 8° with respect to the XY plane perpendicular to the Z axis direction to be approximately parallel to the connection end faces 91*a* and 91*b* of the magnetic structures 90*a* and 90*b*.

The magnetic structures 100 and 101 are made of hard magnetic materials (so-called magnets). Magnetization directions of N poles and S poles of the magnetic structures 100 and 101 are set in the Z axis direction.

The magnetic structures 100 and 101 are each made of a hard magnetic material of a half-split structure obtained by dividing a square cylinder into halves. By combining the magnetic structures 100 and 101 to be formed into a square cylinder shape, the connection end face portions of the ferrules 60*a* and 60*b* can be housed inside the cylinder. As described above, the magnetization directions of the N poles and the S poles of the magnetic structures 100 and 101 are set in the Z axis direction, but the magnetization directions of the N poles and the S poles are set to be opposite to each other so that they are integrated with each other by a magnetic attraction force. For example, the magnetization direction of the magnetic structure 100 is set so that the S pole and the N pole are arranged in order in the Z axis direction from the magnetic structure 90*a* side, while the magnetization direction of the magnetic structure 101 is set so that the N pole and the S pole are arranged in order in the Z axis direction from the magnetic structure 90*a* side.

It is not necessary to fix the magnetic structures 100 and 101 to the ferrules 60*a* and 60*b*. After the ferrules 60*a* and 60*b* have been connected to each other, the magnetic structures 100 and 101 are attached later, and thus a magnetic attraction force can be generated between the magnetic structures 90*a* and 90*b*.

When the connection of the optical connectors 9*a* and 9*b* is released, the magnetic attraction force between the magnetic structures 90*a* and 90*b* can be eliminated by removing the magnetic structures 100 and 101, and thus the connection of the ferrules 60*a* and 60*b* can be easily released, and attaching and detaching work of the optical connectors 9*a* and 9*b* can be easily performed.

In order to insert the magnetic structures 100 and 101, it is required to set a length of the magnetic structure 90*b* shorter than a distance between the magnetic structures 90*a* and 90*b*. Although a slight gap is generated between the magnetic structure 90*a* and the magnetic structures 100 and 101 or between the magnetic structure 90*b* and the magnetic structures 100 and 101 due to mechanical tolerance or the like, the gap may be a factor of lowering the magnetic attraction force.

Thus, a soft magnetic material such as a magnetic metal foil may be added between the magnetic structure 90*a* and the magnetic structures 100 and 101 or between the magnetic structure 90*b* and the magnetic structures 100 and 101. By adding the soft magnetic material, a reduction in the magnetic attraction force can be inhibited.

In the present example, attachment and detachment of the connecting end faces of the ferrules 60*a* and 60*b* and attachment and detachment of the magnetic structures 100 and 101 can be performed in separate steps, and thus the attaching and detaching work of the optical connectors 9*a* and 9*b* can be easily performed. When the connection of the optical connectors 9*a* and 9*b* is released, the connection of the ferrules 60*a* and 60*b* can be released after the magnetic structures 100 and 101 have been removed, and thus the connection can be released with a small force, and workability at the time of disconnection can be improved.

Further, in the present example, by forming the magnetic structures 100 and 101 to be attached later, there is no need to worry about the magnetic attraction force between the magnetic structures 90*a* and 90*b* when the ferrules 60*a* and 60*b* are connected to each other, and workability at the time of connection can be improved. The magnetic structures 100 and 101 are attached after the ferrules 60*a* and 60*b* have been connected to each other, but the attachment is not performed simultaneously with the connection of the ferrules 60*a* and 60*b*, and thus sudden collision of the magnetic structures 90*a* and 90*b* with the magnetic structures 100 and 101 can be easily prevented by using a jig or the like.

In addition, in the present example, even if chipped powder of the magnetic structures 100 and 101 is generated, there is a low possibility of the powder adhering to the connection end faces of the ferrules 60*a* and 60*b* after the connection of the ferrules 60*a* and 60*b* is completed, and thus there is a low possibility that the optical characteristics may deteriorate.

Also, in the present example, similarly to the first example, the connection end faces of the ferrules 60*a* and 60*b*, the connection end faces of the optical fibers 5*a* and 5*b*, and the end faces of the magnetic structures 90*a* 90*b*, 100, and 101 may be perpendicular to the Z axis direction.

Also, in the present example, the magnetic structures 100 and 101 may not be two half-split structures, but they may be formed by combining two or more hard magnetic materials and attaching the cylindrical third magnetic structure obtained by combining these hard magnetic materials to peripheries of the connection end faces of the ferrules 60*a* and 60*b*.

Although the first to fourth examples have been described above, it is needless to say that embodiments of the present invention can also be applied to any combination of connection objects, connection structures, connection end faces, positioning structures, magnetic structures, materials, and arrangements of various components described in the first to fourth examples.

INDUSTRIAL APPLICABILITY

Embodiments of the present invention can be applied to techniques for connecting optical connectors.

The invention claimed is:

1. An optical connector connection structure comprising:

a first optical connector attached to a tip of a first optical fiber, the first optical connector comprising a first alignment component configured to fix the first optical fiber and a first magnetic structure comprising a first soft magnetic material and integrated with the first alignment component;

a second optical connector attached to a tip of a second optical fiber and connectable to the first optical connector at a connection end face, the second optical connector comprising a second alignment component configured to fix the second optical fiber and a second magnetic structure comprising a second soft magnetic material and integrated with the second alignment component, the second magnetic structure having a length shorter in a longitudinal direction of the first optical fiber than that of the first magnetic structure; and a third magnetic structure comprising a hard magnetic material, the third magnetic structure being disposed on a first end face side that is opposite the connection end face between the second magnetic structure and the first magnetic structure, wherein the third magnetic structure comprises two or more hard magnetic material elements, the two or more hard magnetic material elements being combined with each other to comprise the third magnetic structure having a cylindrical shape that is attached to a periphery of the second alignment component.

2. The optical connector connection structure according to claim 1, wherein the second magnetic structure comprises two or more soft magnetic material elements, the two or more soft magnetic material elements being disposed at a periphery of the second alignment component and separated from each other via a gap filled with air or a nonmagnetic material.

3. The optical connector connection structure according to claim 1, further comprising a fourth magnetic structure comprising a third soft magnetic material and disposed on a second end face side that is opposite a second connection end face between the third magnetic structure and the second magnetic structure.

4. The optical connector connection structure according to claim 1, wherein the first alignment component and the second alignment component and the first magnetic structure and the second magnetic structure have positioning structures for determining a first positional relationship between the first alignment component and the first magnetic structure and a second positional relationship between the second alignment component and the second magnetic structure, respectively.

5. The optical connector connection structure according to claim 1, wherein the second magnetic structure is integrally molded with the second alignment component.

6. The optical connector connection structure according to claim 1, wherein the first alignment component and the second alignment component and the first magnetic structure and the second magnetic structure have positioning structures for determining a first positional relationship between the first alignment component and the first magnetic structure and a second positional relationship between the second alignment component and the second magnetic structure, respectively.

7. The optical connector connection structure according to claim 1, wherein the second magnetic structure is integrally molded with the second alignment component.

8. An optical connector connection structure comprising:

a first optical connector attached to a tip of a first optical fiber, the first optical connector comprising a first alignment component configured to fix the first optical fiber and a first magnetic structure comprising a first soft magnetic material and integrated with the first alignment component;

a second optical connector attached to a tip of a second optical fiber and connectable to the first optical connector at a connection end face, the second optical connector comprising a second alignment component configured to fix the second optical fiber and a second magnetic structure comprising a second soft magnetic material and integrated with the second alignment component, the second magnetic structure having a length shorter in a longitudinal direction of the first optical fiber than that of the first magnetic structure; and a third magnetic structure comprising a hard magnetic material, the third magnetic structure being disposed on a first end face side that is opposite the connection end face between the second magnetic structure and the first magnetic structure, wherein the second magnetic structure comprises two or more soft magnetic material elements, the two or more soft magnetic material elements being disposed at a periphery of the second alignment component and separated from each other via a gap filled with air or a nonmagnetic material.

9. The optical connector connection structure according to claim 8, further comprising a fourth magnetic structure comprising a third soft magnetic material and disposed on a second end face side opposite a second connection end face between the third magnetic structure and the second magnetic structure.

10. The optical connector connection structure according to claim 8, wherein the first alignment component and the second alignment component and the first magnetic structure and the second magnetic structure have positioning structures for determining a first positional relationship between the first alignment component and the first magnetic structure and a second positional relationship between the second alignment component and the second magnetic structure, respectively.

11. The optical connector connection structure according to claim 8, wherein the second magnetic structure is integrally molded with the second alignment component.

12. An optical connector connection structure comprising:

a first optical connector attached to a tip of a first optical fiber, the first optical connector comprising a first alignment component configured to fix the first optical fiber and a first magnetic structure comprising a first soft magnetic material and integrated with the first alignment component;

a second optical connector attached to a tip of a second optical fiber and connectable to the first optical connector at a connection end face, the second optical connector comprising a second alignment component configured to fix the second optical fiber and a second magnetic structure comprising a second soft magnetic material and integrated with the second alignment component, the second magnetic structure having a length shorter in a longitudinal direction of the first optical fiber than that of the first magnetic structure;

a third magnetic structure comprising a hard magnetic material, the third magnetic structure being disposed on a first end face side that is opposite the connection end face between the second magnetic structure and the first magnetic structure; and a fourth magnetic structure comprising a third soft magnetic material and disposed on a second end face side that is opposite a second connection end face between the third magnetic structure and the second magnetic structure.

13. The optical connector connection structure according to claim 12, wherein the fourth magnetic structure comprises two or more soft magnetic material elements, the two or more soft magnetic material elements being combined with each other to comprise the fourth magnetic structure having a cylindrical shape that is attached to a periphery of the second alignment component.

14. The optical connector connection structure according to claim 13, wherein the first alignment component and the second alignment component and the first magnetic structure and the second magnetic structure have positioning structures for determining a first positional relationship between the first alignment component and the first magnetic structure and a second positional relationship between the second alignment component and the second magnetic structure, respectively.

15. The optical connector connection structure according to claim 13, wherein the second magnetic structure is integrally molded with the second alignment component.

16. The optical connector connection structure according to claim 12, wherein the first alignment component and the second alignment component and the first magnetic structure and the second magnetic structure have positioning structures for determining a first positional relationship between the first alignment component and the first magnetic structure and a second positional relationship between the second alignment component and the second magnetic structure, respectively.

17. The optical connector connection structure according to claim 12, wherein the second magnetic structure is integrally molded with the second alignment component.

18. An optical connector connection structure comprising:

a first optical connector attached to a tip of a first optical fiber, the first optical connector comprising a first alignment component configured to fix the first optical fiber and a first magnetic structure comprising a first soft magnetic material and integrated with the first alignment component;

a second optical connector attached to a tip of a second optical fiber and connectable to the first optical connector, the second optical connector comprising a second alignment component configured to fix the second optical fiber and a second magnetic structure comprising a second soft magnetic material and integrated with the second alignment component; and a third magnetic structure comprising a hard magnetic material, the third magnetic structure disposed such that the first magnetic structure and the second magnetic structure are connected to each other in a state in which the first optical connector is connected to the second optical connector;

wherein the first magnetic structure and the second magnetic structure are positioned such that connection end faces of the first alignment component and the second alignment component, which are opposed to each other, protrude with respect to connection end faces of the first magnetic structure and the second magnetic structure, which are opposed to each other; and wherein the third magnetic structure comprises two or more hard magnetic material elements, the two or more hard magnetic material elements being combined with each other to comprise the third magnetic structure having a cylindrical shape that is attached to peripheries of the connection end faces of the first alignment component and the second alignment component.

19. An optical connector connection structure comprising:

a first optical connector attached to a tip of a first optical fiber, the first optical connector comprising a first alignment component configured to fix the first optical fiber and a first magnetic structure comprising a first soft magnetic material and integrated with the first alignment component;

a second optical connector attached to a tip of a second optical fiber and connectable to the first optical connector, the second optical connector comprising a second alignment component configured to fix the second optical fiber; and a second magnetic structure disposed at a periphery of the second alignment component;

wherein the second magnetic structure comprises two or more hard magnetic material elements, the two or more hard magnetic material elements being combined with each other to comprise the second magnetic structure having a cylindrical shape that is attached to a periphery of the second alignment component; and wherein the second alignment component or the second magnetic structure has a positioning structure for determining a positional relationship between the second alignment component and the second magnetic structure.

* * * * *